3,827,901
CALCIUM-ALUMINUM-SILICATE EXTENDER PIGMENT
Thomas S. Griffin, Webster Groves, and Kenneth W. Heywood, Overland, Mo., assignors to N L Industries, Inc., New York, N.Y.
No Drawing. Filed July 24, 1972, Ser. No. 274,271
Int. Cl. C09c 1/02, 1/28, 1/40
U.S. Cl. 106—306         1 Claim

ABSTRACT OF THE DISCLOSURE

This invention relates to a new composition of matter which is useful as a pigment composition for the paper industry. The composition is water insoluble and comprises an intimate mixture of titanium dioxide and a calcium-aluminum-silicate composition in which the amount of titanium dioxide employed is from 0.6 to 4 parts for each part of the calcium-aluminum-silicate composition. The calcium-aluminum-silicate composition is water insoluble and contains the constituents in the amounts indicated (all amounts are expressed by weight):

| Constituents: | Parts by weight |
|---|---|
| CaO | 1 |
| $Al_2O_3$ | 0.8–1.2 |
| $SiO_2$ | 12–16 |
| $H_2O$ | 2–4 |

BACKGROUND OF THE INVENTION

Many types of pigment materials have been used in the paper industry for opacifying the paper. Among those most commonly used are opacifiers such as $TiO_2$ and zinc oxide pigments and extenders such as clays, silicates, carbonates and the like. The instant invention is concerned with the use of titanium dioxide pigment used in conjunction with silicate extenders such as calcium silicate and aluminum silicate.

In preparing paper, the paper pulp is admixed with the opacifiers and extenders and to the mixture is added resins for sizing and alum for flocculating the size. Although calcium silicate has been used in the past as the extender in conjunction with $TiO_2$ pigment, it has been found that some of the calcium silicate reacts with the alum present thus reducing the amount of alum available for flocculating.

It would, therefore, be desirable to produce a new composition of matter which contains the opacifying agent and an extender which does not adversely affect the chemical reagents used in the paper making process while at the same time produce a paper which has high opacity, particularly dry hiding power.

A pigment composition containing aluminum silicate, calcium sulfate and titanium dioxide pigment is described and claimed in copending application Ser. No. 79,708, filed Oct. 9, 1970, by Thomas S. Griffin, Warren Rodgers and Charles R. Trampier. This application is assigned to the same assignee as that in the instant case. This copending application has now issued as U.S. Pat. No. 3,681,101 on August 1, 1972.

Although this composition of matter is useful in the paper industry, a sizeable portion of the calcium sulfate present in the composition is soluble and reacts with the alum used to flocculate the pulp.

It would, therefore, be desirable to produce a composition of matter which is insoluble in water and does not react readily with the alum used.

SUMMARY OF THE INVENTION

A new composition of matter has been produced which is insoluble in water and does not react readily with the constituents (e.g. alum and the like) used in the paper making operation.

The calcium-aluminum-silicate composition contains the following ingredients in the proportions indicated:

| Ingredients: | Parts by weight |
|---|---|
| CaO | 1 |
| $Al_2O_3$ | 0.8–1.2 |
| $SiO_2$ | 12–16 |
| $H_2O$ | 2–4 |

This composition is intimately mixed with titanium dioxide pigment wherein the amount of titanium dioxide employed is from 0.6 to 4 parts for each part of the calcium-aluminum-silicate composition described above (all of the parts expressed by weight).

This new composition of matter is prepared by the instant process which comprises forming an aqueous slurry of calcium compound selected from the group consisting of calcium sulfate, calcium hydroxide and calcium carbonate, said calcium compound being present in said slurry in amount from 5 to 50 g.p.l., as CaO, preparing an aqueous solution of aluminum sulfate, said aluminum sulfate being present in amount from 25 to 75 g.p.l., calculated as $Al_2O_3$, mixing said aluminum sulfate solution with said aqueous slurry containing said calcium compound, the amount of said aluminum sulfate added being sufficient to lower the pH of mixture to pH 3.0–3.5, adding to said mixture a previously prepared solution of sodium silicate to form said calcium-aluminum-silicate composition, the amount of sodium silicate present in said solution being from 25 to 150 g.p.l., as $SiO_2$, and the amount of sodium silicate solution added to said mixture being sufficient to raise the pH of the total mixture to pH 4.5–5.5, the time of addition of the sodium silicate solution preferably should be 15 to 90 minutes and should be held with agitation for 30 minutes to one hour. The calcium-aluminum-silicate composition formed should contain from 0.8 to 1.2 parts of aluminum oxide, from 12 to 16 parts of silica and from 2 to 4 parts water for each part of calcium oxide present in said composition. The composition should then be washed to remove the soluble sodium compound formed. To the said washed composition is added $TiO_2$ pigment, the amount of $TiO_2$ added being from 0.6 to 4 parts for each part of calcium-aluminum-silicate used. The mixture is then thoroughly blended, dried and milled.

In order to describe the instant invention more fully, the following examples are presented:

EXAMPLE 1

In this example 0.46 kg. of calicium sulfate slurry containing 18.9 g.p.l. CaO was prepared. To this slurry was added .918 kg. of aluminum sulfate solution containing 327 g.p.l. aluminum sulfate.

This amount of aluminum sulfate was sufficient to lower the pH of the mixture to 3.2. To this calcium-aluminum-sulfate mixture was added 0.943 kg. of a sodium silicate solution containing 376 g.p.l. sodium silicate in which the ratio of $Na_2O$ to $SiO_2$ was 0.30. This amount of sodium silicate was sufficient to raise the pH of the mixture to 5.0. The sodium silicate solution was added to the calcium-aluminum-sulfate slurry over a period of 58 minutes.

The calcium-aluminum-silicate formed was then filtered and washed with water to remove the sodium sulfate. To this washed precipitate was added .642 kg. of titanium dioxide pigment and the mixture was thoroughly blended to produce the product of the instant invention.

This product was analyzed and found to contain the following composition:

| | Percent |
|---|---|
| CaO | 1.4 |
| $Al_2O_3$ | 2.7 |
| $SiO_2$ | 21.0 |
| $H_2O$ | 4.7 |
| $TiO_2$ | 70.0 |

This composition was then tested for opacity in a paper hand sheet using the TAPPI-1425 procedure. It was found that the paper hand sheet filled with this composition possessed an opacity of 86.6%.

It should be noted that the opacity of 86.6% is very high when the composition used contained only 70% $TiO_2$ since this opacity is very close to the 87.4% opacity which is obtained using 100% $TiO_2$ as the opacifying agent.

The operational details and the results obtained are recorded in the following table.

EXAMPLES 2–3

In these examples the procedure of Example 1 was used except that the calcium sulfate was replaced by calcium carbonate in Example 2 while calcium hydroxide was used in Example 3.

Again compositions similar to that produced in Example 1 were obtained. The operational details and results obtained are also recorded in the following table.

From the above examples it has clearly been shown that calcium-aluminum-silicate-$TiO_2$ compositions have been produced which possess high opacities when used as fillers in paper hand sheets. Although the $TiO_2$ contents in the calcium-aluminum-silicate-$TiO_2$ compositions are about 70%, the opacities of the paper sheets are from 85.8% to 86.6% as compared to 87.4% for the opacity of a paper sheet containing 100% $TiO_2$ used in the opacifying agent.

All of these products are also insoluble in water as compared to the products produced by the prior art application Ser. No. 79,708 described above.

While this invention has been described and illustrated by the examples shown, it is not intended to be strictly limited thereto, and other variations and modifications may be employed within the scope of the following claims.

TABLE

| | Example | | |
|---|---|---|---|
| | 1 | 2 | 3 |
| Operational details: | | | |
| Calcium sulfate slurry, kg | 0.046 | | |
| Calcium carbonate slurry, kg | | 0.0344 | |
| Calcium hydroxide slurry, kg | | | .0258 |
| Calcium oxide, g.p.l | 18.9 | 18.9 | 18.9 |
| Aluminum sulfate, soln. kg | 0.918 | 0.935 | 0.935 |
| Aluminum sulfate, g.p.l | 327 | 327 | 327 |
| pH of mixture | 3.2 | 3.5 | 3.4 |
| Sodium silicate soln, kg | 0.943 | 0.945 | 0.945 |
| Sodium silicate, g.p.l | 376 | 376 | 376 |
| $Na_2O/SiO_2$ ratio | 0.3 | 0.3 | 0.3 |
| Time of addition, min | 58 | 16 | 16 |
| pH of final mixture | 5.0 | 4.5 | 4.5 |
| Titanium dioxide, kg | 0.642 | 0.642 | 0.642 |
| Properties: Opacity of paper hand sheet, percent | 86.6 | 86.2 | 85.8 |

What is claimed is:

1. Process for the preparation of a water insoluble calcium-aluminum-silicate composition useful as an extender for paper and the like which comprises forming an aqueous slurry of a calcium compound selected from the group consisting of calcium sulfate, calcium carbonate and calcium hydroxide, said slurry containing from 5 g.p.l. to 50 g.p.l. CaO, forming an aqueous solution of aluminum sulfate, said aluminum sulfate solution containing from 25 g.p.l. to 75 g.p.l. $Al_2O_3$, mixing said aluminum sulfate solution with said aqueous slurry containing said calcium compound, the amount of said aluminum sulfate added being sufficient to lower the pH of the mixture to pH 3.0–3.5, adding over a period of from 15 to 90 minutes to said mixture a previously prepared solution of sodium silicate to form said calcium-aluminum-silicate composition, said sodium silicate solution containing from 25 g.p.l. to 150 g.p.l. $SiO_2$, the amount of said sodium silicate solution added to said mixture being sufficient to raise the pH of the total mixture to pH 4.5–5.5, holding under agitation for a period of from 30 minutes to 1 hour, said calcium-aluminum-silicate composition formed containing from 0.8 to 1.2 parts of aluminum, from 12 to 16 parts of silicate and from 2 to 4 parts of water for each part of calcium present in said composition, washing said composition to remove the soluble sodium compound formed, all of the parts expressed on a weight basis.

References Cited
UNITED STATES PATENTS

| | | | |
|---|---|---|---|
| 2,935,438 | 5/1960 | Craig | 106—306 |
| 3,681,101 | 8/1972 | Griffin | 106—299 |
| 2,786,758 | 3/1957 | Taylor | 106—306 |

DELBERT E. GANTZ, Primary Examiner

J. V. HOWARD, Assistant Examiner

U.S. Cl. X.R.

106—300